(12) United States Patent
Couwenhoven et al.

(10) Patent No.: US 8,064,665 B2
(45) Date of Patent: Nov. 22, 2011

(54) TONE SCALE TRANSFORMATION FOR RADIOLOGICAL IMAGES

(75) Inventors: Mary E. Couwenhoven, Fairport, NY (US); Michael D. Heath, Rochester, NY (US); Xiaohui Wang, Pittsford, NY (US); Heidi D. Zhang, Los Gatos, CA (US); Patrick B. Heffernan, Campbell, CA (US)

(73) Assignee: Carestream Health, Inc., Rochester, NY (US)

( * ) Notice: Subject to any disclaimer, the term of this patent is extended or adjusted under 35 U.S.C. 154(b) by 1037 days.

(21) Appl. No.: 11/942,183

(22) Filed: Nov. 19, 2007

(65) Prior Publication Data

US 2008/0166034 A1 Jul. 10, 2008

Related U.S. Application Data

(60) Provisional application No. 60/860,418, filed on Nov. 21, 2006.

(51) Int. Cl.
*G06K 9/00* (2006.01)

(52) U.S. Cl. .................. 382/128; 382/132; 378/98.3

(58) Field of Classification Search .............. 382/128
See application file for complete search history.

(56) References Cited

U.S. PATENT DOCUMENTS

| 5,317,427 | A | 5/1994 | Ichikawa |
| 5,369,572 | A | 11/1994 | Haraki et al. |
| 5,410,144 | A | 4/1995 | Lavelle et al. |
| 6,778,691 | B1 | 8/2004 | Barski et al. |
| 6,895,077 | B2 * | 5/2005 | Karellas et al. ............. 378/98.3 |
| 7,394,925 | B2 * | 7/2008 | Hayashida ................... 382/132 |

FOREIGN PATENT DOCUMENTS

| EP | 1 113 391 A2 | 7/2001 |
| EP | 1 136 843 A2 | 9/2001 |
| WO | WO 98/37738 | 8/1998 |

* cited by examiner

*Primary Examiner* — Phillip A Johnston

(57) ABSTRACT

A method for transforming radiological image data from a digital receiver obtains digital image data values from the digital receiver and compensates for exposure response differences between a screen film system and the digital receiver. Modulation transfer function differences between the screen film system and the digital receiver are compensated and noise content at frequencies approaching the Nyquist frequency for the digital receiver is suppressed.

9 Claims, 10 Drawing Sheets

TONE SCALE TRANSFORMATION FOR RADIOLOGICAL IMAGES

CROSS REFERENCE TO RELATED APPLICATION

The present invention claims priority of Provisional Application No. 60/860,418 filed Nov. 21, 2006 for Tone Scale (H & D Curve) Transformation for Multi-Acquisition CAD, in the names of Daoxian H. Zhang, Xiaohui Wang, and Patrick B. Heffernan.

FIELD OF THE INVENTION

The invention relates generally to computer-aided detection (CAD) and computer-aided diagnosis (CADx) for radiological images and more particularly to a method for transforming image data obtained from a digital detector to a suitable form for CAD/CADx.

BACKGROUND OF THE INVENTION

Conventional radiography uses photostimulable phosphor screens and photosensitive silver-halide film media for recording images of human anatomy. CAD/CADx algorithms have been developed to assist radiologists and physicians to detect and diagnose various diseases. Before digital radiography (DR) systems became widely available, a considerable amount of research and development effort had been expended, over a period of about twenty years, to train and optimize CAD/CADx algorithms based on film images digitized with film digitizers.

Advances in imaging technology now make it possible to capture radiography images directly as digital data, without the use of photosensitive film. Digital imaging can be performed using computed radiography (CR) apparatus that records image data on an erasable sheet of stimulable storage phosphors and using direct DR apparatus that obtains image data directly from received radiation. In this specification, CR and DR collectively are referred to as digital radiography imaging systems. Digital receivers of these types are particularly advantaged, not only for their wider dynamic range over conventional screen/film imaging, but also because they create new opportunities to separate and individually optimize image capture, processing, and display processes of the overall imaging chain.

Although digital radiography imaging systems enjoy advantages over conventional screen/film-based systems, they impose a new challenge to the existing base of CAD/CADx algorithms. As is well known to those skilled in the diagnostic imaging arts, screen/film, CR, and DR imaging modalities exhibit very different response characteristics with respect to radiation intensity, image sharpness, system noise, and other factors. CAD/CADx algorithms that are particularly trained and optimized for use with digitized data from screen/film systems may not perform well when provided with raw (unprocessed) data from the digital radiography imaging system.

FIG. 1 shows a typical response of the screen/film system between the incident x-ray exposure level (E) and the film density (D), which generally follows a sigmoid shape between D and the logarithm of E. Digital radiography systems, on the other hand, generally record the x-ray exposure level in linear exposure space, then optionally convert this into logarithmic exposure space.

Following the pattern used for the Digital Imaging and Communications in Medicine (DICOM) standard, digital radiography imaging systems output the image data in either of two main formats. These formats differ from each other in function and in data representation and are appropriately termed "For Processing" and "For Presentation" formats. Referring to the block diagram of FIG. 2, raw image data from a digital detector 10 is conditioned by a processor 12 that provides either or both types of output, either For Presentation data for a display 14 or data For Processing by a CAD system 20 or other image processing systems.

For Presentation data are used for input to film printers or diagnostic workstations, so that the displayed films on a lightbox or the displayed images on a diagnostic workstation would be directly suitable for visual assessment by radiology personnel for diagnosis. A number of methods were initially devised for improving the appearance of images obtained from CR or DR digital detectors, so that the digital image resembles and improves the corresponding film image. One example technique for improvement of the presentation image is described in commonly assigned U.S. Pat. No. 6,778,691 entitled "Method of Automatically Determining Tone-Scale Parameters for a Digital Image". As radiologists become more familiar with the digital "look" created by digital image processing, their preferences gradually shift toward images with additional spatial processing such as edge sharpening (U.S. Pat. No. 5,369,572) and dynamic range compression (U.S. Pat. No. 5,317,427). Because For Presentation data are optimized for display and visual assessment, edge characteristics associated with various disease features in the image can be artificially modified by the image processing algorithms that improve visual contrast enhancement (for example, spatial processing). However, because of this modification, this same For Presentation data can be unsuitable for the CAD/CADx algorithms that have been trained based on digitized film images.

For Processing data overcome the problem associated with the For Presentation data and are intended for applications such as CAD/CADx. For Processing data is usually the unprocessed raw data of the digital radiography imaging systems, that is, the original image data provided either in linear exposure space or in logarithmic exposure space. However, in practice, such data may not be directly usable by the CAD/CADx algorithms or may yield poor algorithm performance. The digital data needs some amount of preprocessing in order to compensate for differences in imaging characteristics between screen/film systems and digital radiography imaging systems in terms of exposure response, sharpness, noise, and other characteristics.

There is, then a need for data conversion methods for CAD/CADx that allow digital radiography data to more accurately emulate digitized data received from scanned films.

SUMMARY OF THE INVENTION

It is an object of the present invention to address the difficulties described earlier in the background section. The present invention provides a method for transforming radiological image data from a digital receiver comprising steps of obtaining digital image data values from the digital receiver; compensating for the exposure response differences between a screen film system and the digital receiver; compensating for modulation transfer function differences between the screen film system and the digital receiver; and suppressing the noise content at frequencies approaching the Nyquist frequency for the digital receiver.

The method of the present invention is advantaged over conventional solutions that perform value mapping based solely on tone scale differences.

These and other objects, features, and advantages of the present invention will become apparent to those skilled in the art upon a reading of the following detailed description when taken in conjunction with the drawings wherein there is shown and described an illustrative embodiment of the invention. The invention is defined in the appended claims.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

In the context of the present specification, the term "digitized image data" or simply "digitized data" refers to the image data that originates from exposure of a photosensitive film medium and is then later scanned and digitized with film digitizer. In conventional terminology, this data is said to be in digitized data space. In contrast, the term "digital receiver data" refers to digital data signals obtained directly from a digital receiver, such as that provided in a CR or DR system. This data is said to be in digital receiver data space.

Film density in a digitized film is represented digitally with numeric data that relates to "scaled film density". Every integer unit in scaled film density space represents a corresponding incremental amount of film density. For example, where every integer unit in scaled film density space represents 0.001 film density, the value 2300 would represent 2.3 film density. The pixel value of a scanned film is in scaled film density space. The terms "film density" and "scaled film density" as used herein are considered to be synonymous.

Figure 1:
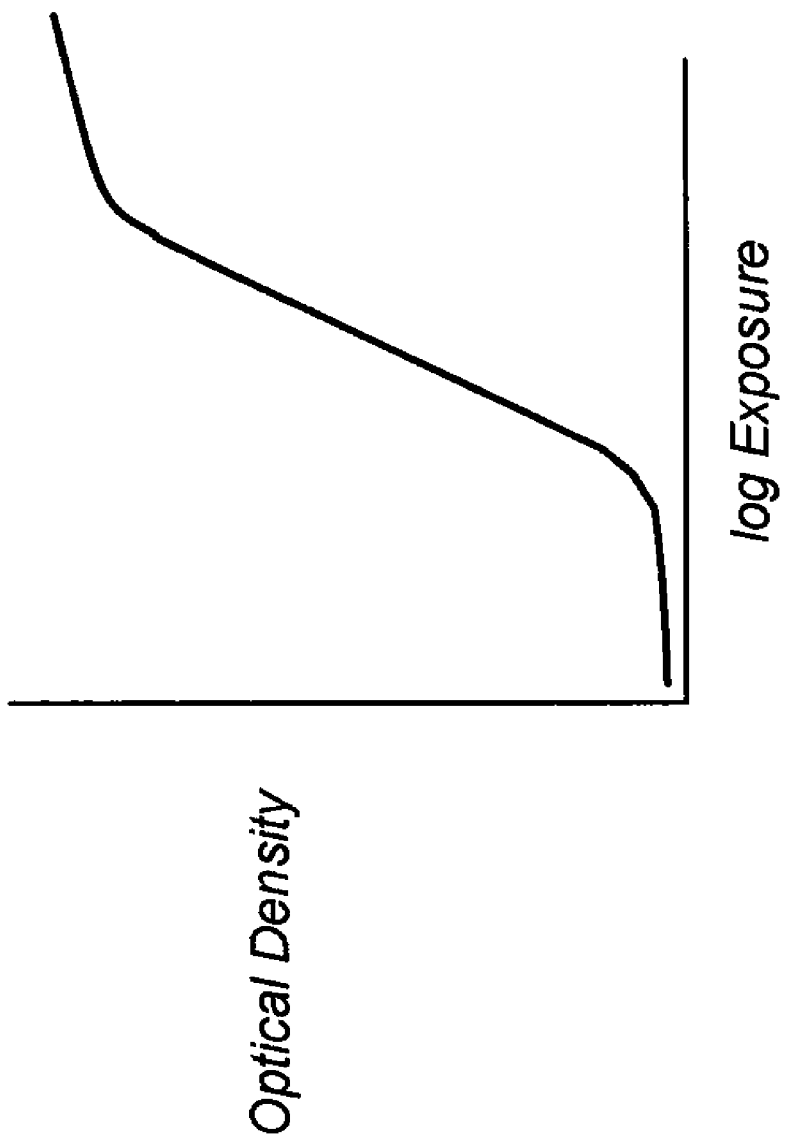
FIG. 1 is a graph showing the characteristic response of photosensitive film to received radiation.
Figure 2:
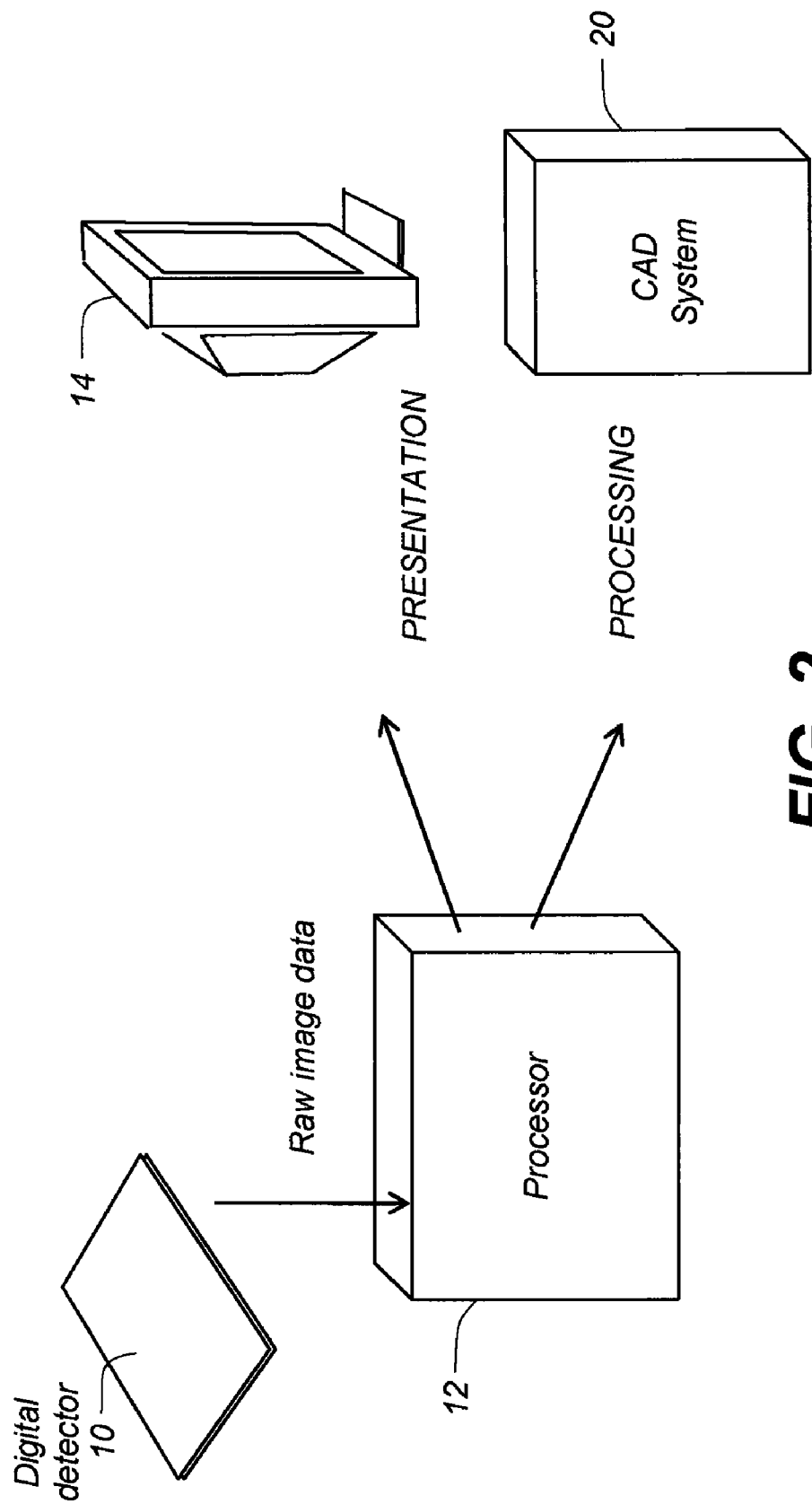
FIG. 2 is a schematic diagram showing a system in which raw image data obtained from a digital detector is processed for visual presentation or for further processing.

The term "tone scale curve" is used herein, as in the imaging arts in general, to describe a characteristic relationship between the incident x-ray exposure and the output film density as rendered by an x-ray imaging system. For film media, the tone scale curve is equivalent to its sensitometric curve, which generally shows how Density relates to Exposure or to the logarithm of Exposure, as shown in FIG. 1.

X-ray exposure is represented digitally with numerical values. The term "x-ray exposure" is referred herein to represent either the actual x-ray exposure levels (for example, in units of mR) or the digital representation of the linearly scaled, actual x-ray exposure levels.

The method of the present invention provides a tone scale (tonal) transformation mechanism that can be used for converting raw image data that is from a CR or DR digital detector to a format suitable for CAD or CADx processing. In addition, this method provides improved spatial frequency response to compensate for differences in MTF and noise between digitized film and digital systems.

Figure 3:
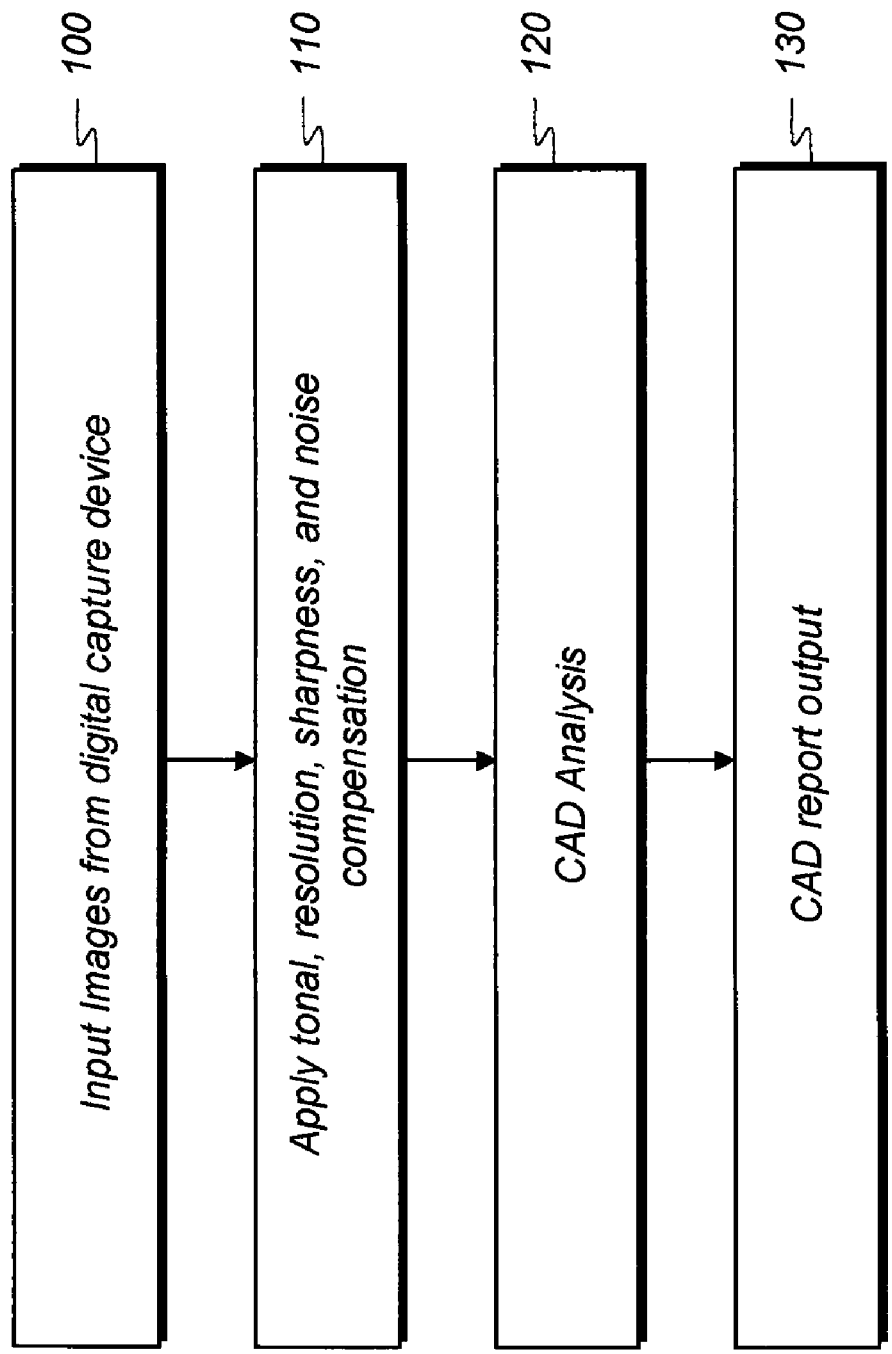
FIG. 3 is a logic flow diagram showing steps for obtaining CAD output from a digital detector.

As shown in FIG. 3, the input images are obtained from the digital detector or capture device (step 100). These images are usually in the unprocessed raw format (For Processing output). A compensation of the tonal, resolution, sharpness, and noise is performed in step 110. Then the data is input to the CAD/CADx algorithm (step 120) for analysis. Finally, a report is generated in step 130.

Tonal Response Compensation

The For Processing data from the digital capture device is usually the unprocessed raw data. The image pixel values in this data can be in either linear exposure response space or logarithmic exposure response space. Conversion from linear exposure space to log exposure space is fairly straightforward, for example, using a formula such as:

$$CV = 1000 \times \log 10(E) + 2000$$

This converts the incident exposure data in mR to scaled log exposure space. For simplification of description in this disclosure, the For Processing data is assumed to be in logarithmic exposure space.

Figure 4:
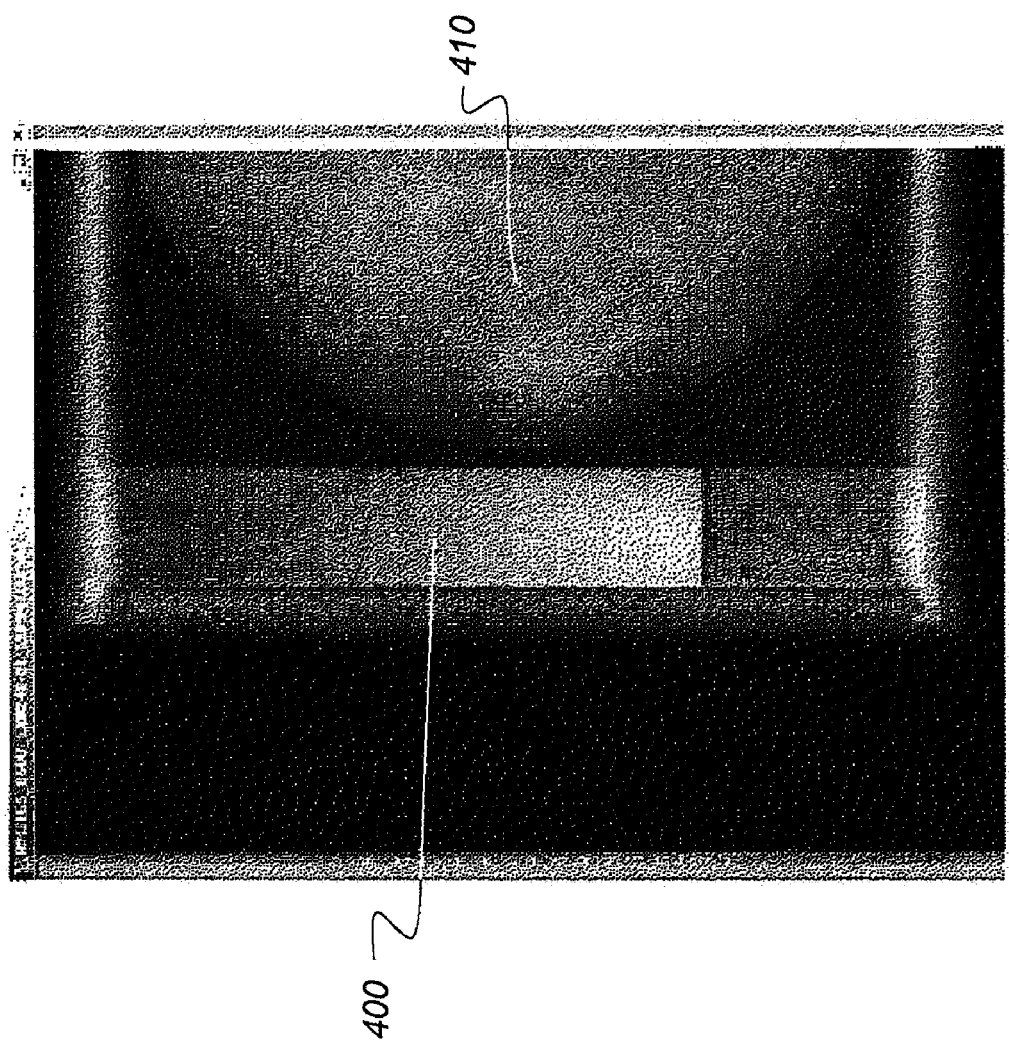
FIG. 4 is an image showing anatomy and a phantom target.
Figure 5:
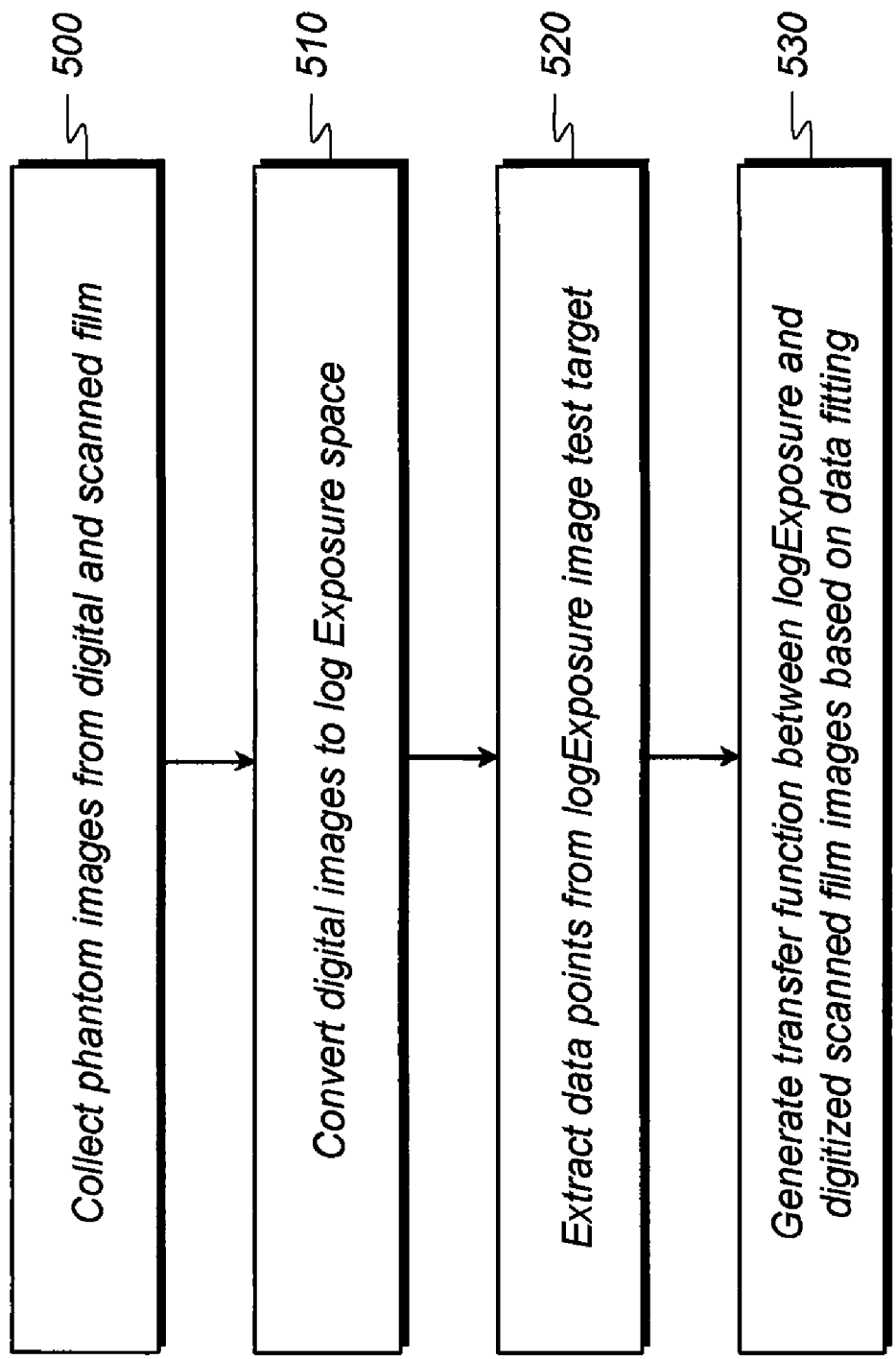
FIG. 5 is a logic flow diagram showing steps for generating a transfer function.

Any of a number of methods can be used to generate a tone scale curve to convert the For Processing data to film density space. In one embodiment of the present invention, the tone scale curve is determined based on physical measurements of the characteristic exposure response curves of both the screen/film system and the digital system. A same subject (anatomy 410 or physical phantom 400, or both) is imaged by both the screen/film system and the digital system. FIG. 4 shows one such image. In the process for generating a transfer function given in FIG. 5, image collection from both sources is performed in a step 500. Preferably the subject that is imaged should have a signal dynamic range that is close to that of the capture devices. In a step 510, the film image is then digitized and the unprocessed raw data from the digital system is converted to log exposure space to facilitate computation. Each image pixel from the digital system is compared with its corresponding pixel in the digitized film image (step 520) and a tone scale transfer function is generated (step 530) based on data fitting to a predefined models, such as polynomials, sigmoid function, or other suitable model.

Figure 6:
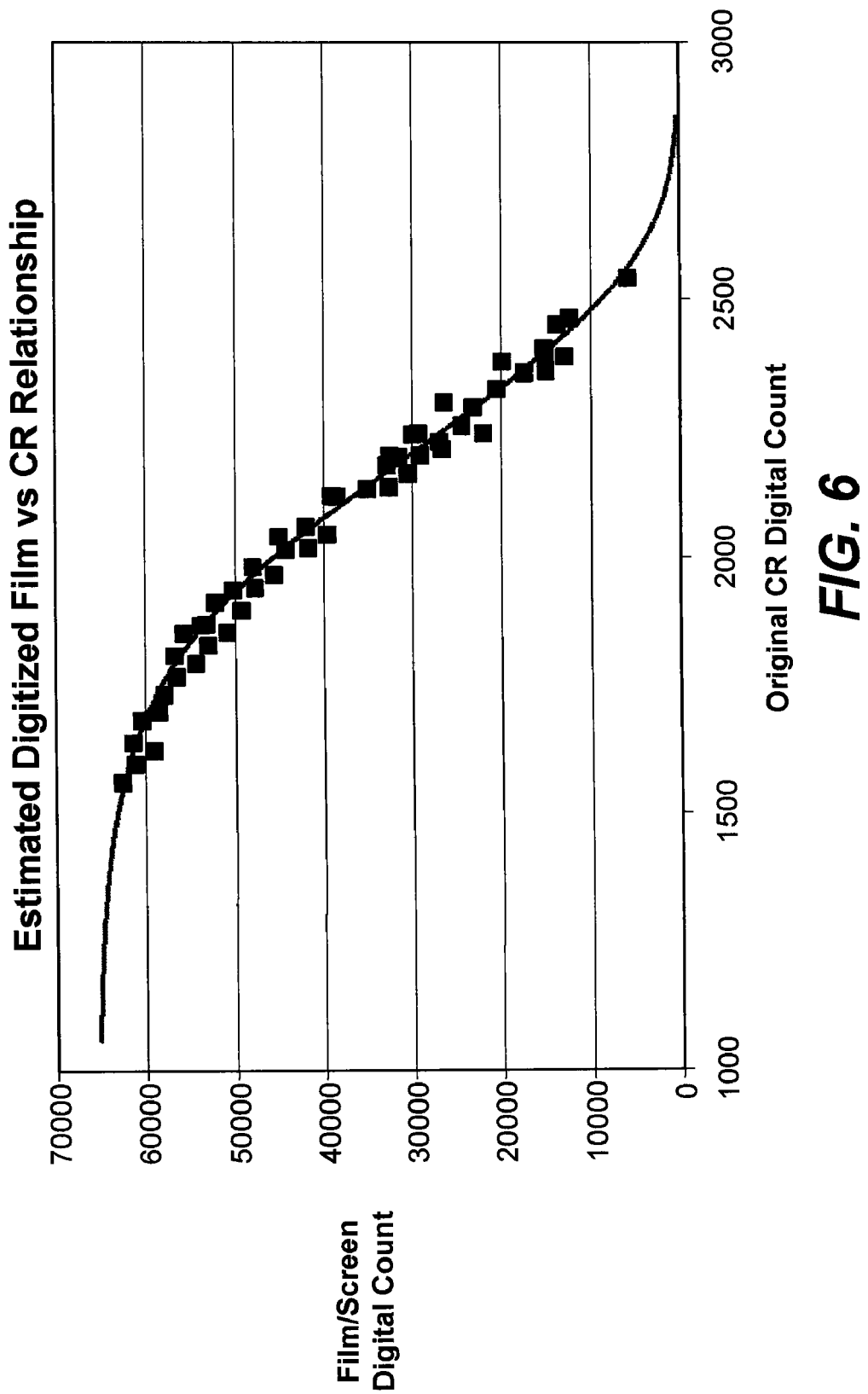
FIG. 6 is a graph showing extracted data points and a fitting function.

A curve can then be fitted to this data using conventional curve-fitting techniques. FIG. 6 shows an example with extracted data points and the sigmoid curve fitting function. In practice, the actual exam exposures can be acquired at different radiographic technique factors (e.g. kVp, mAs, etc). The tonal transformation adapts to the image content itself by superimposing the tone scale curve appropriately over an anatomical region histogram, such as a predefined region relative to the detector or a predefined region relative to the anatomy.

Figure 7:
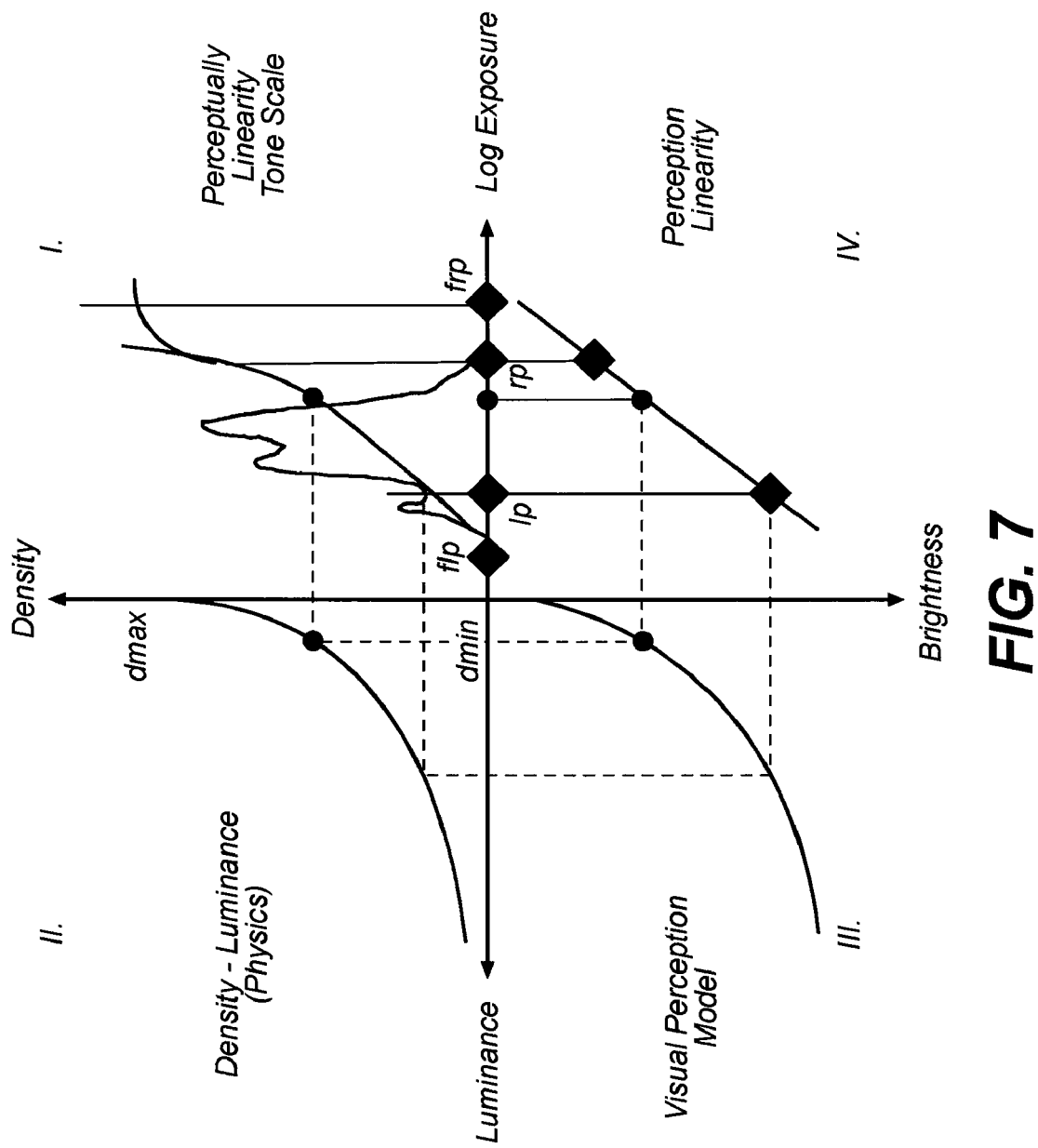
FIG. 7 is a graph showing transforms between different image spaces.

Another method for tonal compensation uses a function based on the human visual response characteristics as specified in previously mentioned U.S. Pat. No. 6,778,691, the disclosure of which is incorporated by reference. The idea is to generate a film image in which equal physical contrast can be perceived by the human observer as equal brightness change. A brief description of this method is summarized in the diagram of FIG. 7. This method begins with the analysis of the log exposure data. Two points are extracted from the pixel value histogram, a left-point (lp) and a right point (rp). Pixel values between lp and rp are linearly mapped to the perceptual brightness space based on a predetermined linear function:

$$\text{Perceptual Brightness} = a * \log E + b.$$

The perceptual brightness is converted to physical luminance based on some known human visual models. The desired film density can be calculated based on the physical luminance by;

$$D = \log 10(L_0/L).$$

The toe and shoulder regions of the tone scale curve are created based on a sigmoid equation, then pasted over the original perceptual linear curve.

Resolution, Sharpness and Noise Compensation

In addition to tone scale mapping, there are also image resolution, sharpness and noise differences between screen/film and digital systems. Some compensation for these differences allows images captured from the two different systems to be processed using the same CAD algorithms.

System resolution and sharpness are best characterized by the MTF. The MTF can be measured with several methods, such as using slit, edge, or line-pair targets that are well known in the art. Noise characteristics can be easily obtained from a series of flat field images acquired at different exposure levels.

Figure 8:
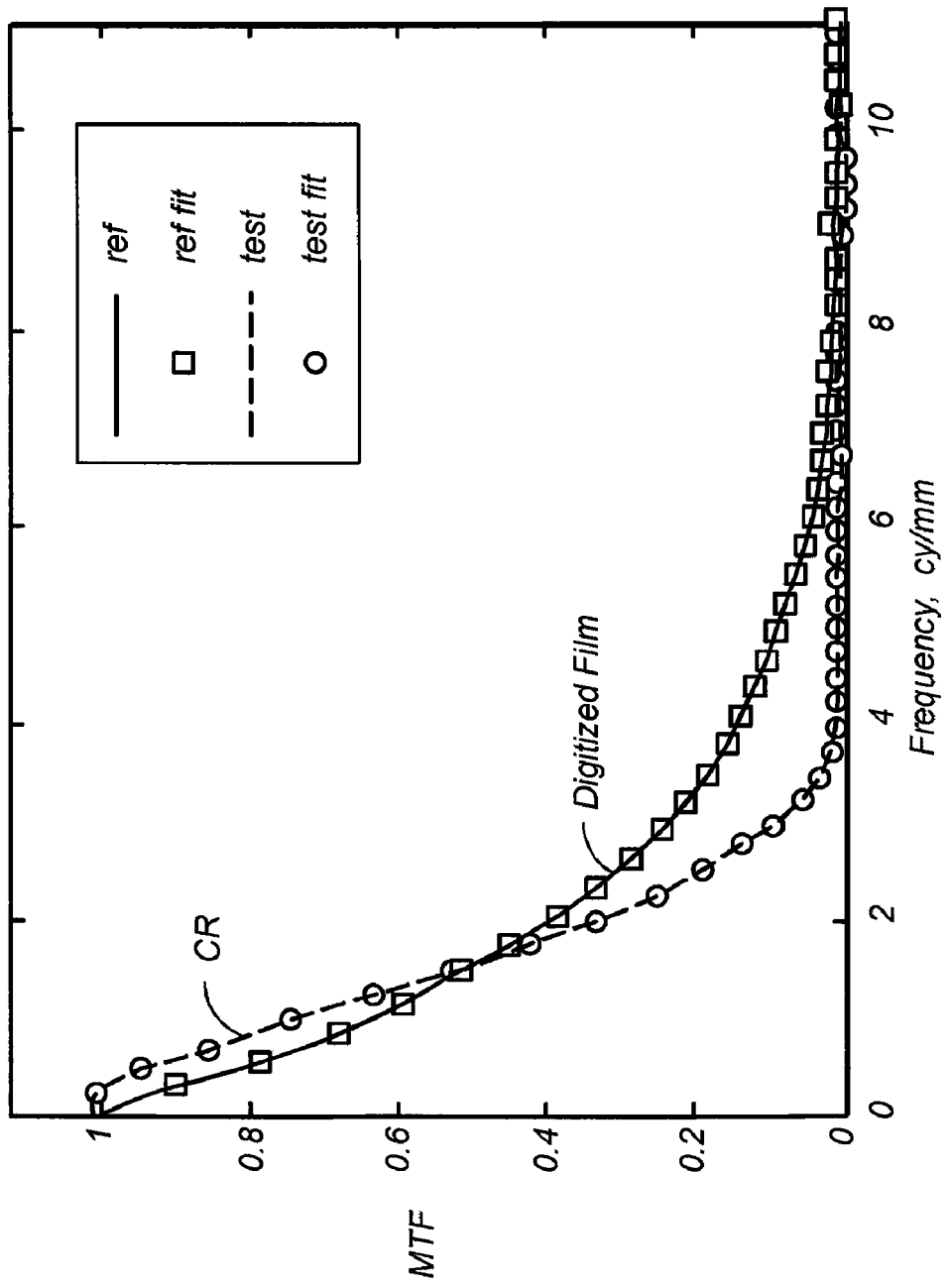
FIG. 8 is a graph comparing modulation transfer function (MTF) values for a digital receiver and digitized film.

Test target data can be obtained by imaging reference phantoms using digital detectors and digitized film using standard techniques. A gray scale target, as shown earlier in FIG. 4, serves as a useful device for providing the needed edge-definition data. The test target data that is obtained can be used to measure the effective spatial frequency response of the systems as shown in the graph of FIG. 8, where the MTF responses of both the digitized film and a CR system are shown. As FIG. 8 shows, the MTF of digitized film is higher over a range of frequencies (between approximately 2 cy/mm and 10 cy/mm in the example shown) than that of a CR digital detector.

Figure 9:
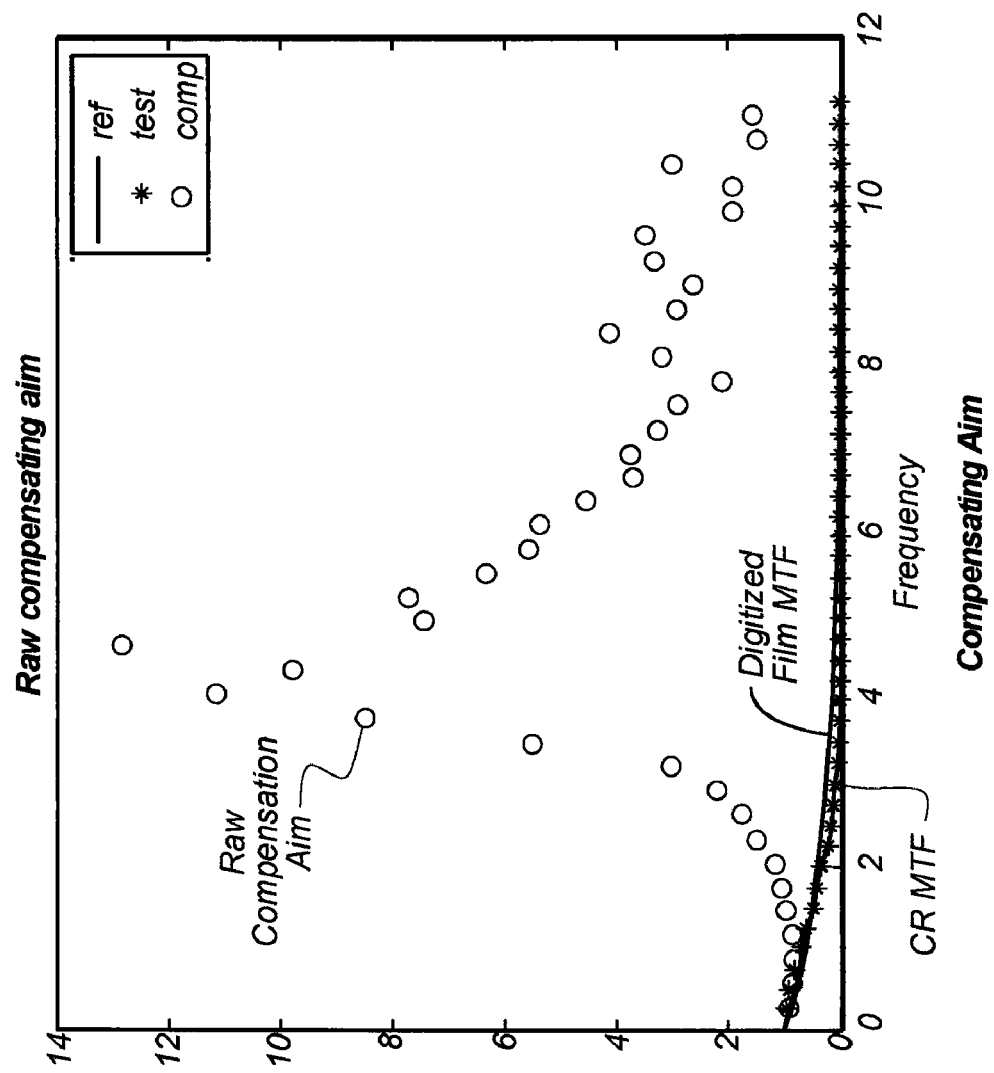
FIG. 9 is a graph showing raw compensation aims and MTF values.
Figure 10A:
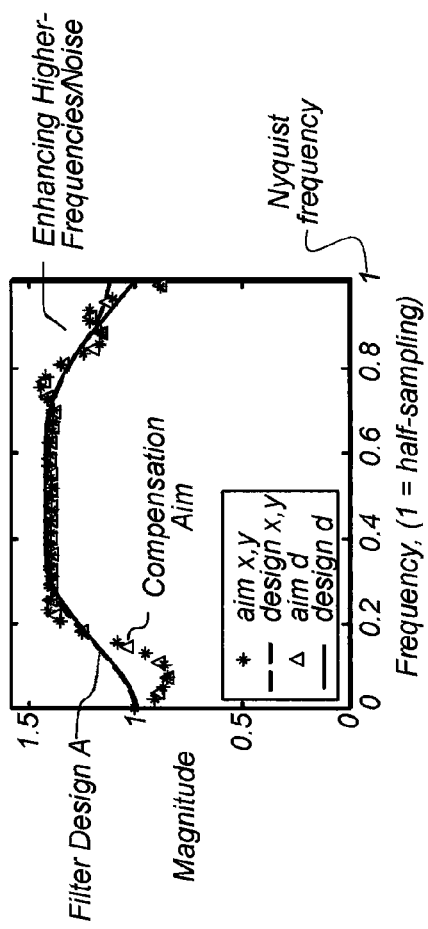
FIG. 10A is a graph showing one filter design for compensation that enhances high-frequency noise.

Compensation for MTF differences can be obtained by comparing these values and using this comparison to guide spatial filter design. The graph of FIG. 9 again shows MTF curves for CR digital detection and digitized film. FIG. 9 also shows, for incremental values, the ratio of effective spatial frequency response of the film digitizer to that of the specified digital detector as raw compensation aim values. These then serve as a guide (compensation aim) for designing the spatial filtering that is suitable for compensating for MTF differences between the digitized and digital data, as shown in the graph of FIG. 10A. For this graph of spatial filter response, the abscissa is in terms of the Nyquist or half-sampling frequency of the digital detector; the ordinate shows filter response with a value of 1 indicating zero amplification. Filter design A in FIG. 10A can be generated using information derived from the ratio of MTF values described with reference to FIG. 9.

Figure 10B:
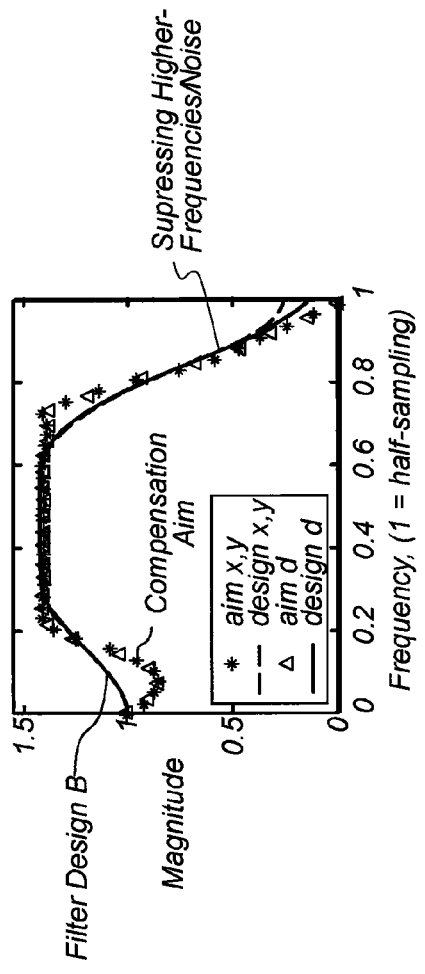
FIG. 10B is a graph showing one filter design for compensation that suppresses high-frequency noise.

As is well known to those skilled in the imaging arts, the noise in an image is represented by relatively high spatial frequencies. Thus, noise can be inadvertently amplified by the spatial filtering used for MTF compensation. As was shown in FIGS. 8 and 9, the MTF differences can be rather significant over a range of frequencies, including higher frequencies. Unless care is taken, MTF compensation can amplify the higher frequencies, and, in turn, amplify the noise, as shown in FIG. 10A. At frequencies approaching the Nyquist frequency, the signal can be enhanced, inadvertently amplifying noise. To help alleviate this problem, the spatial filter can be designed to reduce noise amplification by suppressing the higher frequencies that represent the noise as shown in FIG. 10B. In FIG. 10B, Filter design B suppresses frequencies above about 0.8 times the Nyquist frequency, thereby suppressing or controlling noise.

In another embodiment an adaptive filter scheme can be employed to reduce the amplification of noise in signal dependent manner and further may be a function of signal dependent statistics in order to reduce the impact of noise suppression on image features. As is well known to those skilled in the radiographic imaging arts, noise can vary according to exposure level. Noise compensation can be varied correspondingly over the range of exposures.

The spatial filter design is based on how well the filter response fits the aim response and also based somewhat on visual similarity between the digitized film and the image from the digital system. The spatial frequency response can be calculated and the spatial filter can be commonly applied in either linear or log exposure space before or after the tonal rendering.

Using the MTF functions to derive a compensation function for resolution, sharpness, and noise is a useful starting point that provides at least a first approximation of the compensation that is needed. In practice, this initial compensation can be further adjusted to achieve the best performance of the CAD/CADx algorithm. This is also true for the tonal compensation.

The invention has been described with reference to a preferred embodiment. However, it will be appreciated that variations and modifications can be effected by a person of ordinary skill in the art without departing from the scope of the invention. For example, various types of reference phantom could be used.

Thus, what is provided is a method for correlating image data obtained from a digital detector with image data that originated from digitized film.

PARTS LIST

10. Digital detector
12. Processor
14. Display
20. CAD system
100-130. Method steps
400. Phantom
410. Anatomy
500-530. Method steps

The invention claimed is:

1. A method for transforming radiological image data from a digital receiver comprising:
    (a) obtaining digital image data values from the digital receiver;
    (b) compensating for the exposure response differences between a screen film system and the digital receiver;
    (c) compensating for modulation transfer function differences between the screen film system and the digital receiver; and
    (d) suppressing the noise content at frequencies approaching the Nyquist frequency for the digital receiver.

2. The method of claim 1 wherein compensating for modulation transfer function differences comprises:
    (i) computing the ratio of modulation transfer values between the screen film system and the digital receiver; and
    (ii) forming a spatial filter according to the ratio of computed modulation transfer values.

3. The method of claim 2 further comprising attenuating frequencies above about 0.8 times the Nyquist frequency of the digital receiver.

4. The method of claim 1 wherein the digital image data values are from a computed radiography receiver.

5. The method of claim 1 wherein the digital image data values are from a digital radiography receiver.

6. The method of claim 1 wherein compensating for the exposure response differences uses a tone scale curve.

7. The method of claim 6 wherein tone scale curve is formed by a process comprising:

(i) collecting phantom images from the digital receiver to obtain digital receiver values;

(ii) collecting phantom images from scanned film to obtain digitized values;

(iii) converting the digital receiver values to log Exposure values;

(iii) extracting data points from the log Exposure values; and (iv) generating a transfer function between the digital receiver values and the digitized values according to the extracted data points.

8. The method of claim 6 wherein the tone scale curve is formed according to human visual perception characteristics.

9. The method of claim 1 wherein suppressing the noise content varies with exposure.

* * * * *